United States Patent [19]

Rapoport

[11] Patent Number: 4,630,275
[45] Date of Patent: Dec. 16, 1986

[54] CONTROLLED SLOW Q-SWITCH

[75] Inventor: William R. Rapoport, Ventura, Calif.

[73] Assignee: Allied Corporation, Morris Township, Morris County, N.J.

[21] Appl. No.: 680,030

[22] Filed: Dec. 10, 1984

[51] Int. Cl.$^4$ ............................................. H01S 3/117
[52] U.S. Cl. ....................................... 372/13; 372/25; 372/20; 372/26; 372/18
[58] Field of Search ....................... 372/10, 12, 13, 25, 372/26, 20, 69, 82, 30, 41, 18

[56] References Cited

U.S. PATENT DOCUMENTS

| | | | |
|---|---|---|---|
| 3,500,233 | 3/1970 | Doyle et al. | 372/94 |
| 3,622,912 | 11/1971 | Doyle et al. | 372/27 |
| 3,896,397 | 7/1975 | de Wit et al. | 372/13 |
| 3,936,769 | 2/1986 | de Wit et al. | 372/13 |
| 4,308,506 | 12/1981 | Ellis | 372/13 |
| 4,375,684 | 3/1983 | Everett | 372/12 |
| 4,509,829 | 4/1985 | Peterson | 372/26 |

OTHER PUBLICATIONS

"The Output Characteristics of a Slowly Q-Switched Neodymium in Calcium Tungstate Laser" *J. Phys. D.*, 1968, Ser. 2, vol. 1, pp. 1849–1851.

"The Theory of Q-Switching Applied to Slow Switching and Pulse Shaping for Solid State Lasers" *J. Phys. D.*, 1968, Ser. 2, vol. 1, pp. 1125–1133.

*Solid-State Laser Engineering*, Walter Koechner, 1976, pp. 402–404.

*Primary Examiner*—Leon Scott, Jr.
*Attorney, Agent, or Firm*—James Riesenfeld

[57] ABSTRACT

By applying to a laser Q-switch a staircase-shaped control signal, a plurality of laser pulses are emitted with controlled energy and time separation. Compared with conventional Q-switching, the invention enables the laser to emit pulses with shorter time intervals, narrower linewidths, higher output energy, and more uniform power density across the laser beam cross section. The apparatus and method are particularly well-suited for use with low-gain lasers, such as alexandrite.

9 Claims, 7 Drawing Figures

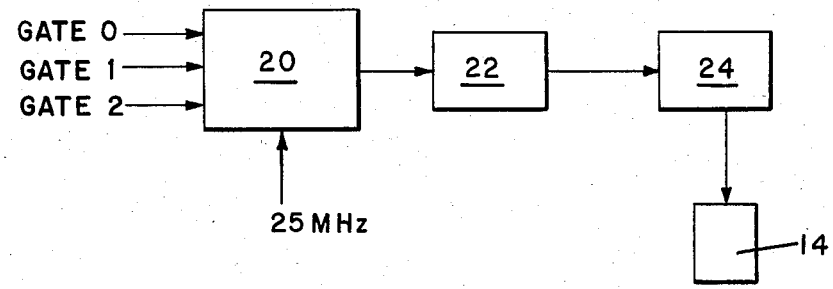
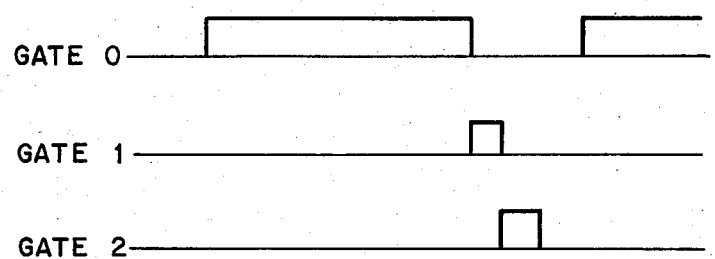
FIG. 5
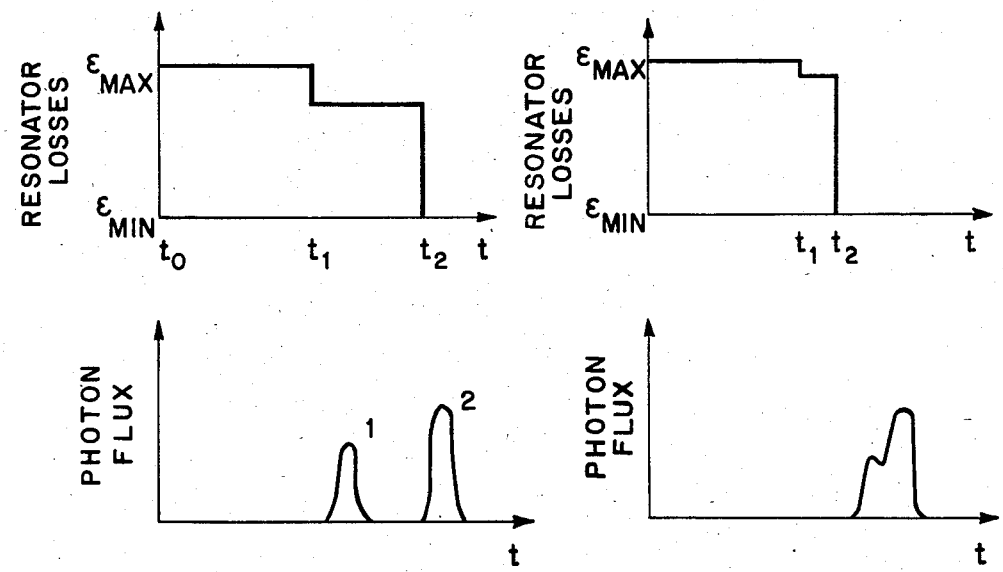
FIG. 6  FIG. 7

CONTROLLED SLOW Q-SWITCH

BACKGROUND OF THE INVENTION (1) Field of the Invention

This invention relates to Q-switched lasers and, more particularly, to a method and apparatus for controlled slow Q-switching.

(2) Description of the Prior Art

Q-switching is a commonly-used method for achieving high pulse power from a laser. The method involves first pumping a laser medium while the optical "Q" of the laser resonant cavity is kept low, during which laser emission is prevented and energy is stored in the laser medium; then "switching" the Q to a high value, at which the stored energy is released in the form of a very short ("giant") pulse.

Generally, it is considered desirable to minimize the time for switching the Q of the resonant cavity in order to insure the efficient production of a single large pulse. However "slow" Q-switching has also been studied (see, e.g., *Solid-State Laser Engineering*, W. Koechner, Springer-Verlag, New York (1976), pp. 402-404). Slowly Q-switched lasers were disclosed by Midwinter, who simulated Q-switching using a rotating mirror (Brit. J. Appl. Phys. 16, 1125 (1965)), and by Newbery, who reported on experiments involving an electro-optically Q-switched CaWO$_4$:Nd laser (Brit. J. Appl. Phys. (J. Phys. D.), 1, 1849 (1968)). In both cases, it was reported that multiple pulses result for long switching times.

SUMMARY OF THE INVENTION

In accordance with the present invention, a slowly Q-switched laser comprises:

(a) an optical resonator having reflector means at either end;

(b) a laser medium disposed within the resonator;

(c) means for exciting the laser medium to emit coherent radiation;

(d) a Q-switch mounted between the laser medium and the reflector at one end of the resonator; and (e) means for applying to the Q-switch a control signal having a staircase-shaped time dependence.

In operation, a method for obtaining multiple Q-switch pulses comprises:

(a) providing a laser that has a resonant cavity and a Q-switch for controlling the loss in the resonant cavity, with a certain Q-switch pulse buildup time, and (b) operating the laser while applying to the Q-switch a staircase-shaped control signal to reduce the loss in a plurality of steps.

The apparatus and method permit controlled laser pulse amplitude, as well as shorter time intervals between pulses and narrower (wavelength) line widths than are possible with conventional Q-switching. In addition, reduced peak power results in less likelihood of damage to the laser medium or optical elements.

BRIEF DESCRIPTION OF THE DRAWINGS

FIG. 5 depicts a schematic of electronics that accomplish controlled slow Q-switching.

FIG. 6 depicts a particular sequence of pulses achieved by the present invention.

FIG. 7 depicts another sequence of pulses achieved by the present invention.

DETAILED DESCRIPTION OF THE INVENTION

A "slow Q-switch" is an oxymoron, since the very nature of a Q-switch is to provide a very rapid release of energy from a laser. Nevertheless, the term has been used in all the references cited earlier and seems to be well established. It refers to a Q-switch characterized by a relatively long switching time.

Figure 1:
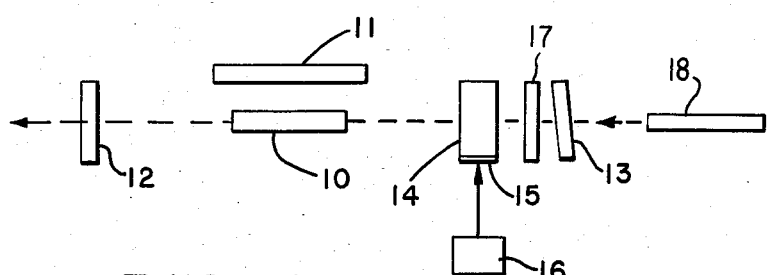
FIG. 1 is a schematic of a Q-switched laser.

FIG. 1 is a schematic of a Q-switched laser, including laser medium 10, pump source 11, reflectors 12 and 13, and Q-switch 14. In the figure, Q-switch 14 is an acousto-optical device, which has a transducer 15 mounted on one end, and is controlled by an RF driver 16. If the laser is tunable, it may include optional tuning means 17. Injection locking may be accomplished using external source 18.

Figure 2:
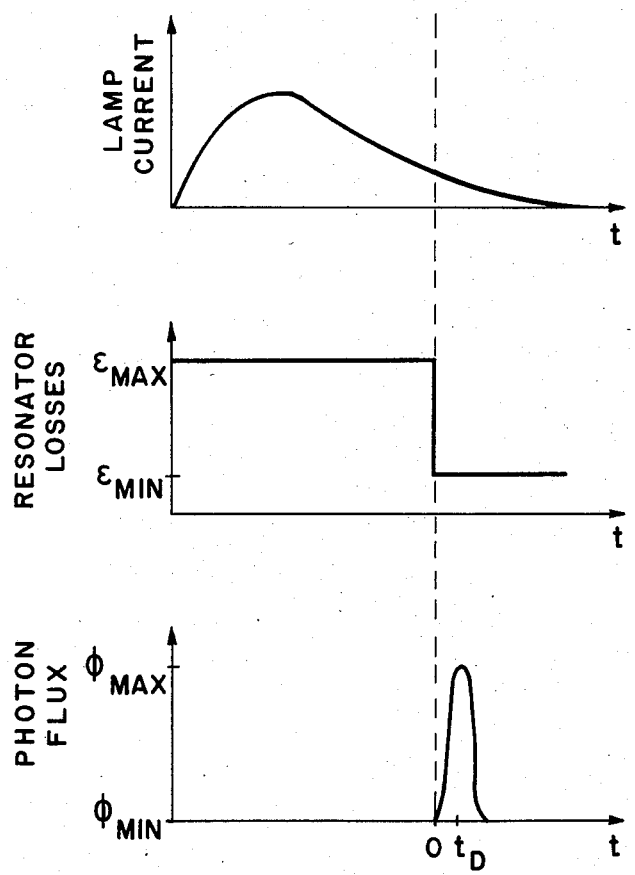
FIG. 2 depicts the development of a conventional Q-switched laser pulse.

FIG. 2 shows the development of a conventional ("fast") Q-switched laser pulse, as depicted by Koechner, loc. cit., p. 398. As shown there, the losses in a laser cavity are instaneously reduced at t=0; and a Q-switched pulse is emitted after a delay, $t_D$, during which the radiation density in the laser cavity builds up from noise.

Figure 3:
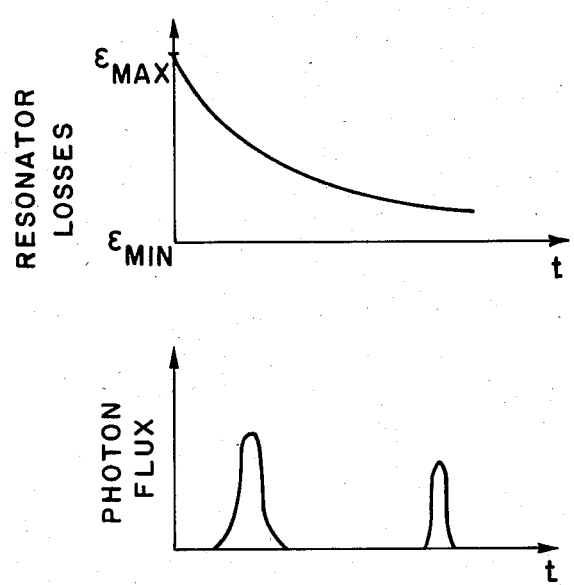
FIG. 3 depicts development of multiple pulses from a "slow" Q-switch.

In a slow Q-switch, the losses are reduced over a period of time, the "switching time," $t_S$. If $t_S > t_D$, multiple laser pulses may be emitted, as shown in FIG. 3. The first pulse is emitted after the loss first falls below the gain. Emission of the pulse reduces the population of the upper level, reducing the gain below the loss. A second pulse is emitted if the upper level population has not been depleted when loss falls below gain for the second time. Such multiple pulses had always been considered a disadvantage that resulted when switching was not fast enough. Thus, it was considered important to shorten $t_S$ and/or increase $t_D$ to avoid the above inequality (Koechner, p. 404; see also *Lasers*, 2nd edition, B. A, Lengyel, Wiley-Interscience, New York (1971), p. 174).

In the present invention, a controlled slow Q-switch (CSQS) provides multiple pulses of predetermined energy at predetermined time intervals. The apparatus comprises an otherwise conventional Q-switched laser that includes means for applying to the Q-switch a control signal having a staircase-shaped time dependence. The control signal thus reduces the loss in the cavity in a series of steps, producing in turn a series of laser pulses. Each laser pulse corresponds to a loss-reduction step. The energy in each pulse and the interval between pulses depend on the energy stored in the laser medium at the onset of a loss-reduction step and on the extent of the loss reduction. Specific desired pulse energies and time intervals can be achieved by routine experimentation. Conventional Q-switching is, in a sense, an extreme case, where the stored energy is a maximum, the entire cavity loss is eliminated in one step, and the maximum energy is emitted in a single laser pulse (see, e.g., Koechner, Chapter 8). Slow Q-switching is an intermediate case, where there is no sudden loss reduction, and either one pulse or more than one pulse is emitted, as was discussed above.

Figure 4:
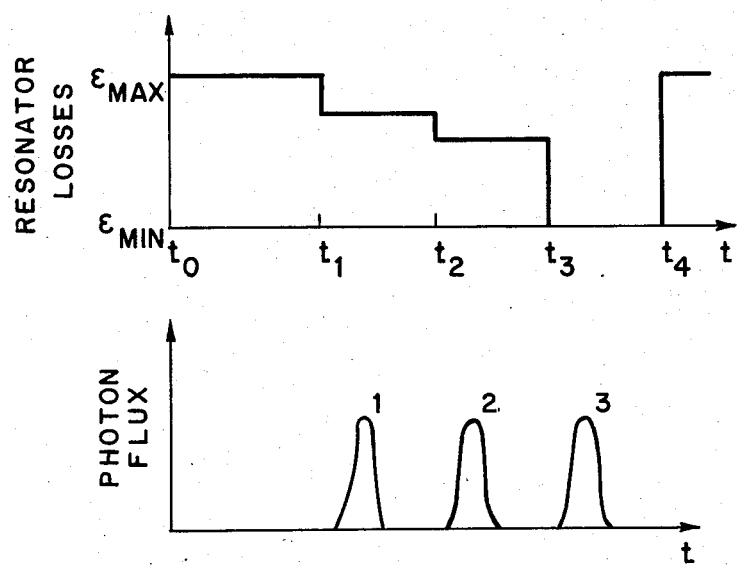
FIG. 4 depicts controlled slow Q-switching of the present invention.

FIG. 4 depicts the operation of a CSQS. At $t_0$, a signal is applied to the Q-switch that is sufficient to hold off laser operation. At $t_1$ and $t_2$, the signal is reduced to reduce the cavity loss and allow the first and second pulses out, respectively. The signal is reduced to 0 at $t_3$, after which the third pulse is emitted. Thereafter, at $t_4$ (just as at $t_0$), a signal is again applied to the Q-switch to inhibit post-lasing. By varying the time intervals between signal reductions and their level, the timing and energies of the laser pulses can be controlled. Ideally (i.e., for maximum output energy), there is no substantial depopulation of excited levels by fluorescent or non-radiative processes during the time interval between the first signal-reduction step and last laser pulse. That requires that either the time interval be short compared with the fluorescence and non-radiative lifetimes of the laser medium or that the medium be pumped during the time interval (either with a long-duration flash or a CW pump source).

FIG. 5 shows a schematic of the electronics that accomplish the 3-pulse lasing, using an a-o Q-switch. The gate signals, 0, 1, and 2, enter RF level control 20, which allows the amplitudes of 1 and 2 to be adjusted. The signals are summed at a FET transistor, which passes the 25 MHz at the adjusted levels. Shaper 22 removes DC components and shapes the signals. The shaper is an L-C filter, peaked at 25 MHz. The signals are amplified in a linear amplifier 24 and sent to Q-switch 14. The widths of the gates are adjustable. The width of gate 0 is generally chosen to correspond to the interval between the start of pumping and the achievement of maximum population inversion. During that interval, energy is stored in the laser medium as the upper level population builds up. The width of gate 1 controls the separation of pulses 1 and 2. Gate 2 controls the separation of pulses 2 and 3. The separations are not linear with the gate width; thus, if the width of gate 1 is reduced, pulse 2 "moves in" faster; i.e., for 1 $\mu$s reduction in gate width, pulse 2 may be emitted ~1.2 $\mu$s sooner (and have greater amplitude, as well).

As can be seen in FIG. 6, a small initial loss-reduction step followed by a large loss reduction, can yield a second laser pulse of higher energy (and emitted after a shorter delay time) than the first.

An important advantage of CSQS is that it permits higher average power densities to develop in laser media than would otherwise be possible, without damage. In a typical laser rod, gain is not uniform over the cross section, with the central portion generally having the highest gain. If the rod is operated at increasingly high power levels, the power densities that develop in a high-gain region ultimately cause rod damage. Thus, the likelihood of rod damage correlates with the ratio of peak- to average-power.

In CSQS, the first-step loss reduction preferentially depletes excited levels in high-gain regions. If the second-step loss reduction follows after a time interval that is short compared with that needed to refill these levels in the high-gain regions, then the power density in the second pulse will be spread more uniformly throughout the rod volume. Based on the same considerations and constraints, successive pulses will have increasingly uniform power density distribution. Thus, the peak- to average-power ratio is reduced and the power output that can be achieved without rod damage is increased. Uniformity across the beam diameter is increased, as well.

Another advantage of CSQS is that it provides a way to reduce the time between successive Q-switches and can, in fact, eliminate the time entirely, so that a second pulse begins before the first has ended. In conventional Q-switching, the minimum delay between successive laser pulses is typically about 30–50 $\mu$s, depending on the material and the pumping power. With a CSQS, the time delay between a stepped loss reduction and a corresponding laser pulse depends on the magnitude of the loss reduction; thus, the pulse corresponding to a second, large loss-reduction step can begin before the pulse corresponding to an earlier, small loss reduction has ended. This "negative" time interval is displayed in FIG. 7.

In a preferred embodiment, if the laser is tunable, successive pulses can be emitted at different wavelengths, if the laser includes a tuning element that is appropriately adjusted in the interim. Alternatively, tuning can be accomplished by injecting into the laser cavity between successive pulses a pulse having the desired wavelength and having intensity substantially greater than the radiation intensity along the axis in the cavity. As is known in the art, this "injection locking" pulse can either be provided by an external source or can be generated internally. Injection locking may be employed whether or not the laser is tunable.

If the first loss-reduction step is small, the corresponding (first) laser pulse is emitted with small energy after a long buildup time. If there is a tuning element in the cavity, radiation makes many passes during the buildup, resulting in a narrow line width. If the second loss-reduction step follows quickly after the first, the decaying laser emission along the axis of the cavity does not fall to the level of noise after the first pulse is emitted. Consequently, the buildup time for a second pulse is correspondingly shortened. Furthermore, the second pulse is locked to the same wavelength and line width. This "frequency locking" generally operates if pulse separation is about 2 $\mu$s or less.

A CSQS may be either electro-optical or acousto-optical; however, acousto-optical is preferred, because control signals are lower voltage and can be modulated more easily.

I claim:

1. A slowly Q-switched laser comprising:
   (a) an optical resonator having reflector means at either end;
   (b) a laser medium disposed within the resonator;
   (c) means for exciting the laser medium to emit coherent radiation;
   (d) an acousto-optical Q-switch mounted between the laser medium and the reflector at one end of the resonator; and
   (e) means for applying to the Q-switch a control signal having a staircase-shaped time dependence which reduces the losses in said resonator in a plurality of steps, thereby producing a series of laser pulses.

2. The laser of claim 1 further comprising means for injection locking.

3. The laser of claim 1 in which the laser is tunable and further comprises tuning means.

4. The laser of claim 3 in which the tuning means provides injection locking.

5. The laser of claim 1 in which the laser medium is alexandrite.

6. A method for obtaining multiple Q-switch pulses comprising (a) providing a laser that has a resonant cavity and a Q-switch for controlling the loss in the resonant cavity, with a certain Q-switch pulse buildup time, and (b) operating the laser while applying to the Q-switch a staircase-shaped control signal to reduce the loss in a plurality of steps.

7. The method of claim 6 in which the time interval between a pair of successive steps is less than the Q-switch pulse buildup time.

8. The method of claim 6 in which the laser is tunable and the tuning is changed to provide successive pulses at different wavelengths.

9. The method of claim 8 in which tuning is accomplished by injection-locking.

* * * * *